US008055268B2

(12) United States Patent
Lee et al.

(10) Patent No.: US 8,055,268 B2
(45) Date of Patent: Nov. 8, 2011

(54) METHOD OF REQUESTING RESOURCES, METHOD OF ALLOCATING RESOURCES, AND APPARATUS THEREOF USING BANDWIDTH REQUEST RANGING IN MOBILE COMMUNICATION SYSTEM

(75) Inventors: Nam-Suk Lee, Daejeon (KR); Kyung-Soo Kim, Daejeon (KR)

(73) Assignees: Electronics and Telecommunications Research Institute, Daejeon (KR); Samsung Electronics Co., Ltd., Suwon-si (KR)

( * ) Notice: Subject to any disclaimer, the term of this patent is extended or adjusted under 35 U.S.C. 154(b) by 1077 days.

(21) Appl. No.: 11/861,728

(22) Filed: Sep. 26, 2007

(65) Prior Publication Data
US 2008/0139216 A1 Jun. 12, 2008

(30) Foreign Application Priority Data
Dec. 7, 2006 (KR) .................. 10-2006-0123924

(51) Int. Cl.
*H04W 72/00* (2009.01)
(52) U.S. Cl. .............. 455/452.2; 455/450; 455/509; 455/451; 455/452.1; 370/329
(58) Field of Classification Search .......... 455/450, 455/452.2, 509, 451, 452.1; 370/329
See application file for complete search history.

(56) References Cited

U.S. PATENT DOCUMENTS

| 2005/0003831 A1* | 1/2005 | Anderson ............... 455/456.1 |
| 2005/0159163 A1* | 7/2005 | Chang et al. ............... 455/450 |
| 2005/0213503 A1 | 9/2005 | Guo et al. |
| 2006/0239241 A1 | 10/2006 | Eom et al. |
| 2006/0245352 A1 | 11/2006 | Kang et al. |
| 2007/0153746 A1 | 7/2007 | Lee et al. |
| 2007/0165562 A1* | 7/2007 | Bourlas et al. ............... 370/328 |
| 2007/0274265 A1 | 11/2007 | Yoon et al. |
| 2008/0056193 A1* | 3/2008 | Bourlas et al. ............... 370/331 |
| 2008/0298315 A1* | 12/2008 | Ihm et al. ............... 370/329 |
| 2010/0074271 A1* | 3/2010 | Iwamura ............... 370/458 |

FOREIGN PATENT DOCUMENTS

| KR | 10-2003-0084243 A | 11/2003 |
| KR | 10-2005-0014319 A | 2/2005 |
| KR | 10-2005-0040688 A | 5/2005 |
| KR | 10-2006-0032741 A | 4/2006 |
| KR | 10-2006-0110950 A | 10/2006 |
| KR | 10-2006-0112999 A | 11/2006 |
| KR | 10-2007-0073626 A | 7/2007 |

* cited by examiner

*Primary Examiner* — Patrick Edouard
*Assistant Examiner* — Justin Lee
(74) *Attorney, Agent, or Firm* — Jefferson IP Law, LLP

(57) ABSTRACT

A method of requesting resources, a method of allocating resources, and an apparatus therefor by using bandwidth request ranging in a mobile communication system are provided. The method of allocating uplink resources to a subscriber station by using bandwidth request ranging in a mobile communication system includes: transmitting an uplink channel descriptor (UCD) including code group information to the subscriber station, wherein the code group information is obtained by dividing a bandwidth request code into a plurality of groups and mapping the groups to predetermined data block sizes; receiving a bandwidth request code selected in the subscriber station; determining a code group including the selected bandwidth request code; and allocating a bandwidth through which a data block size corresponding to the determined code group can be transmitted, to the subscriber station. Accordingly, bandwidth request codes are divided into code groups of which bandwidth request codes represent specific block sizes, and the base station that receives the bandwidth request code allocates uplink resources corresponding to the bandwidth request code, so that it is possible to decrease a transmission delay of the uplink traffic.

8 Claims, 7 Drawing Sheets

METHOD OF REQUESTING RESOURCES, METHOD OF ALLOCATING RESOURCES, AND APPARATUS THEREOF USING BANDWIDTH REQUEST RANGING IN MOBILE COMMUNICATION SYSTEM

CROSS-REFERENCE TO RELATED APPLICATION

This application claims priority to and the benefit of Korean Patent Application No. 10-2006-0123924 filed in the Korean Intellectual Property Office on Dec. 07, 2006, the entire contents of which are incorporated herein by reference.

BACKGROUND OF THE INVENTION (a) Field of the Invention

The present invention relates to a method of requesting resources, a method of allocating resources, and an apparatus therefor by using bandwidth request ranging in a mobile communication system. More particularly, the present invention relates to a method in which a subscriber station requests resources required for transmission of uplink traffic and in which a base station allocates the requested resources, and an apparatus therefor.

(b) Description of the Related Art

FIG. 1 is a flowchart illustrating a procedure of a broadcasting system for broadcasting information in a portable Internet system.

In the portable Internet system, ranging is classified as initial ranging, periodic ranging, bandwidth request (BR) ranging, and hand-off ranging.

The BR ranging is used to request resources that are necessary for a subscriber station to transmit traffic through an uplink. As shown in FIG. 1, a base station (AP: Access Pointer) broadcasts code division multiple access (CDMA) code information as system information used for BR ranging, which is included in an uplink channel descriptor (UCD). The base station broadcasts information on the uplink resources to all subscriber stations, and the subscriber stations use the uplink resources to transmit a BR code through a UL-MAP.

FIG. 2 is a view illustrating a BR ranging procedure in a portable Internet system.

Referring to FIG. 2, the BR ranging procedure is performed in the current portable Internet system, as follows.

When uplink traffic occurs, a subscriber station performs BR ranging in order to transmit the uplink traffic as shown in FIG. 2. More specifically, the subscriber station selects an arbitrary BR code included in the UCD and transmits the selected BR code to the base station in a competition scheme by using resources allocated to the UL-MAP (S210).

Next, when the BR code is successfully received without conflict, the base station broadcasts CDMA_Allocation_IE of the UL-MAP including a frame number of the BR code received from the subscriber station, subchannel information, a received BR code number, and bandwidth allocation information that the subscriber station needs in order to transmit a BR header (S220).

Next, the subscriber station compares the frame number, the subchannel information, and the bandwidth request code number of the CDMA_Allocation_IE included with information that the subscriber station transmits in order to perform the BR ranging. If the information is the same, the subscriber station transmits the BR header by using the uplink resources allocated to the base station (S230). Here, the BR header includes resource information that the subscriber station needs in order to transmit the uplink traffic.

Next, when the BR header is received, the base station allocates the uplink resources with respect to the resources requested by the subscriber station and broadcasts associated information through the UL-MAP (S240). When the resources requested through the UL-MAP are allocated, the subscriber station transmits the uplink traffic.

As described above, in order to transmit the uplink traffic in the portable Internet system, the subscriber station transmits the BR code and is allocated the uplink resources from the base station. In this case, a total of 9 frames are delayed, so there is a problem in that a transmission delay of the uplink traffic increases. Particularly, the transmission delay of the uplink traffic results in an increase in the time taken for transmission of an uplink ACK on a packet that is received through a downlink in a transmission control protocol (TCP)-based Internet service, so there is a problem in that downlink traffic transmission speed is decreased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of requesting resources, a method of allocating resources, and an apparatus thereof, by using bandwidth request ranging in a mobile communication system having advantages of being capable of decreasing transmission delay of uplink traffic in a portable Internet system from the time of transmitting a bandwidth request code to the time of being allocated requested resources from a base station, and being capable of preventing a decrease in downlink traffic transmission speed that is caused by a transmission delay of an uplink ACK in a TCP-based Internet service.

An exemplary embodiment of the present invention provides a method of allocating uplink resources to a subscriber station by using bandwidth request ranging in a mobile communication system, including: transmitting an uplink channel descriptor (UCD) including code group information to the subscriber station, wherein the code group information is obtained by dividing a bandwidth request code into a plurality of groups and mapping the groups to predetermined data block sizes; receiving a bandwidth request code selected in the subscriber station; determining a code group including the selected bandwidth request code; and allocating a bandwidth through which a data block size corresponding to the determined code group can be transmitted to the subscriber station.

Another embodiment of the present invention provides a method of requesting uplink resource allocation to a base station by using bandwidth request ranging in a mobile communication system, including: receiving an uplink channel descriptor (UCD) including code group information from the base station, wherein the code group information is obtained by dividing a bandwidth request code into a plurality of groups and mapping the groups to predetermined data block sizes; selecting an arbitrary bandwidth request code from a code group corresponding to a data size of traffic that is to be transmitted through an uplink; transmitting the selected bandwidth request code to the base station; allocating a bandwidth through which the traffic is transmitted by the base station; and transmitting the traffic through the allocated bandwidth.

Yet another embodiment of the present invention provides a base station for allocating uplink resources to a subscriber station by using bandwidth request ranging in a mobile communication system, including: a transmission module that transmits an uplink channel descriptor (UCD) including code group information to the subscriber station, wherein the code group information is obtained by dividing a bandwidth request code into a plurality of groups and mapping the groups to predetermined data block sizes; a reception module that receives a bandwidth request code selected in the subscriber station; a determination module that determines a code group including the selected bandwidth request code; and an allocation module that allocates a bandwidth through which a data block size corresponding to the determined code group can be transmitted to the subscriber station.

Still another embodiment of the present invention provides a subscriber station for requesting uplink resource allocation to a base station by using bandwidth request ranging in a mobile communication system, including: a reception module that receives an uplink channel descriptor (UCD) including code group information from the base station, wherein the code group information is obtained by dividing a bandwidth request code into a plurality of groups and mapping the groups to predetermined data block sizes; a selection module that selects an arbitrary bandwidth request code from a code group corresponding to a data size of traffic that is to be transmitted through an uplink; a transmission module that transmits the selected bandwidth request code to the base station; an allocation module that receives an allocation of a bandwidth through which the traffic is transmitted from the base station; an a traffic transmission module that transmits the traffic through the allocated bandwidth.

DETAILED DESCRIPTION OF THE EMBODIMENTS

Figure 1:
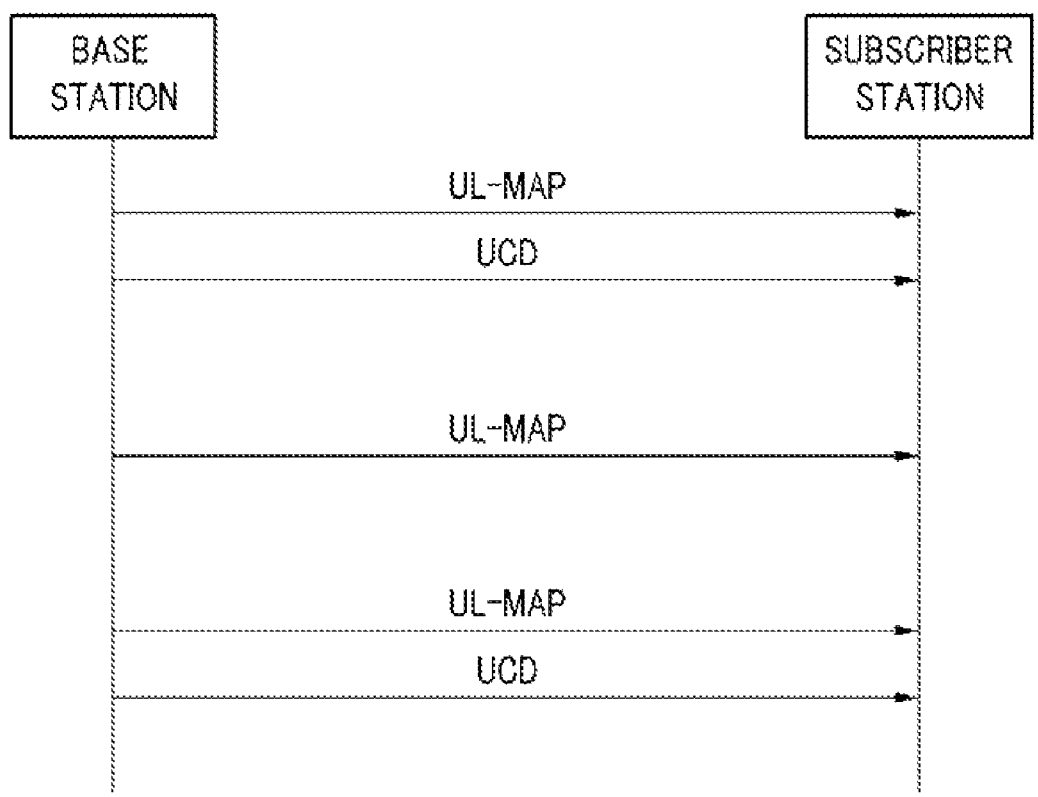
FIG. 1 is a flowchart illustrating a procedure for broadcasting system information in a portable Internet system.
Figure 2:
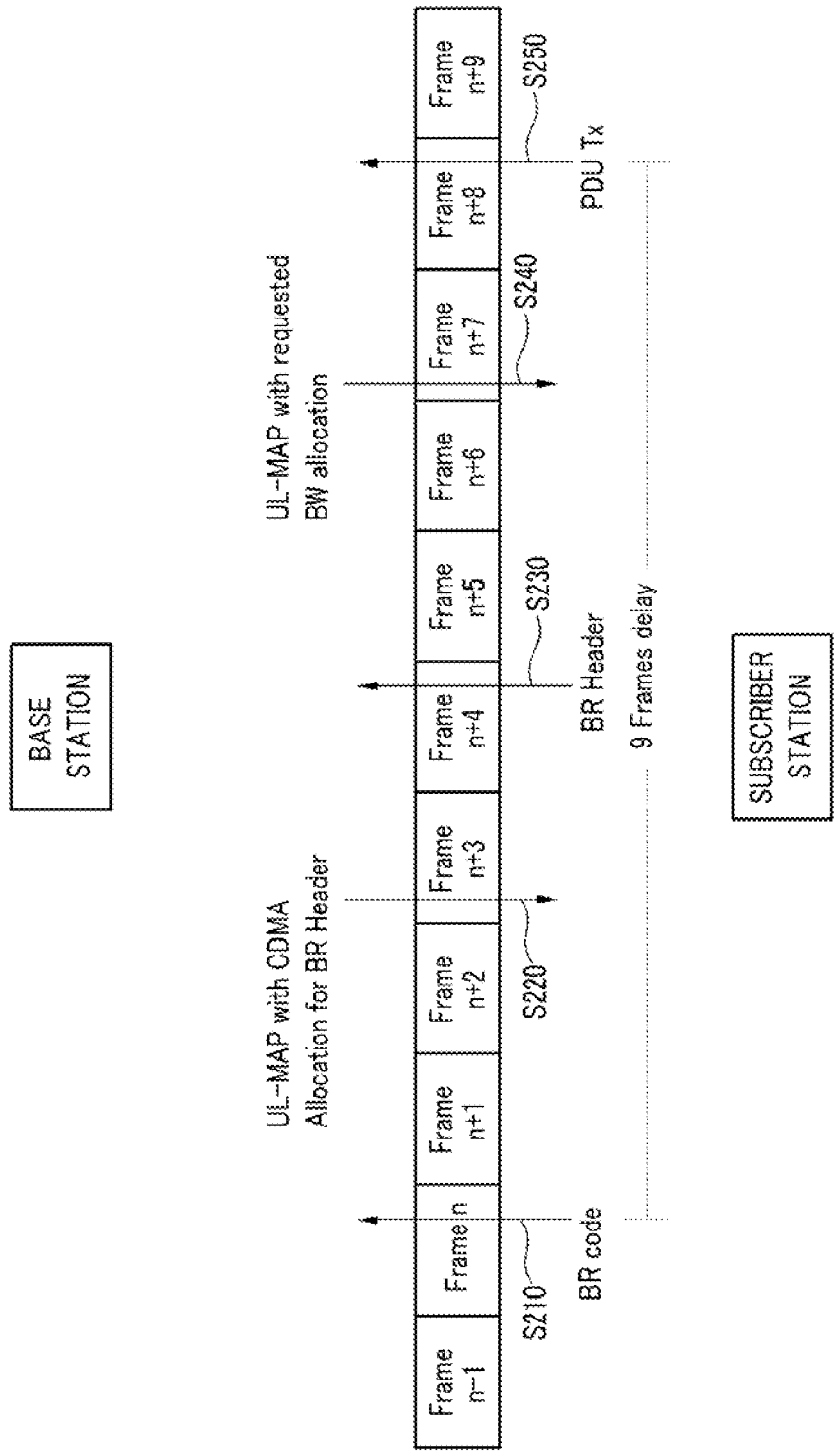
FIG. 2 is a view illustrating a band request (BR) ranging procedure in a portable Internet system.

In the following detailed description, only certain exemplary embodiments of the present invention have been shown and described, simply by way of illustration. As those skilled in the art would realize, the described embodiments may be modified in various different ways, all without departing from the spirit or scope of the present invention. In addition, for clarifying the present invention, portions that are not directly related to the description are omitted in the drawings. Like reference numerals designate like elements throughout the specification.

In the specification, it should be noted that a phrase that a portion "includes" an element means that the other element is not excluded but it can be further included therein if a particularly contrary phase is not disclosed.

In addition, it should be noted that a term "module" disclosed in the specification denotes a unit for performing at least one function or operation, and it can be implemented in combination of hardware, software, or hardware and software.

Figure 3:
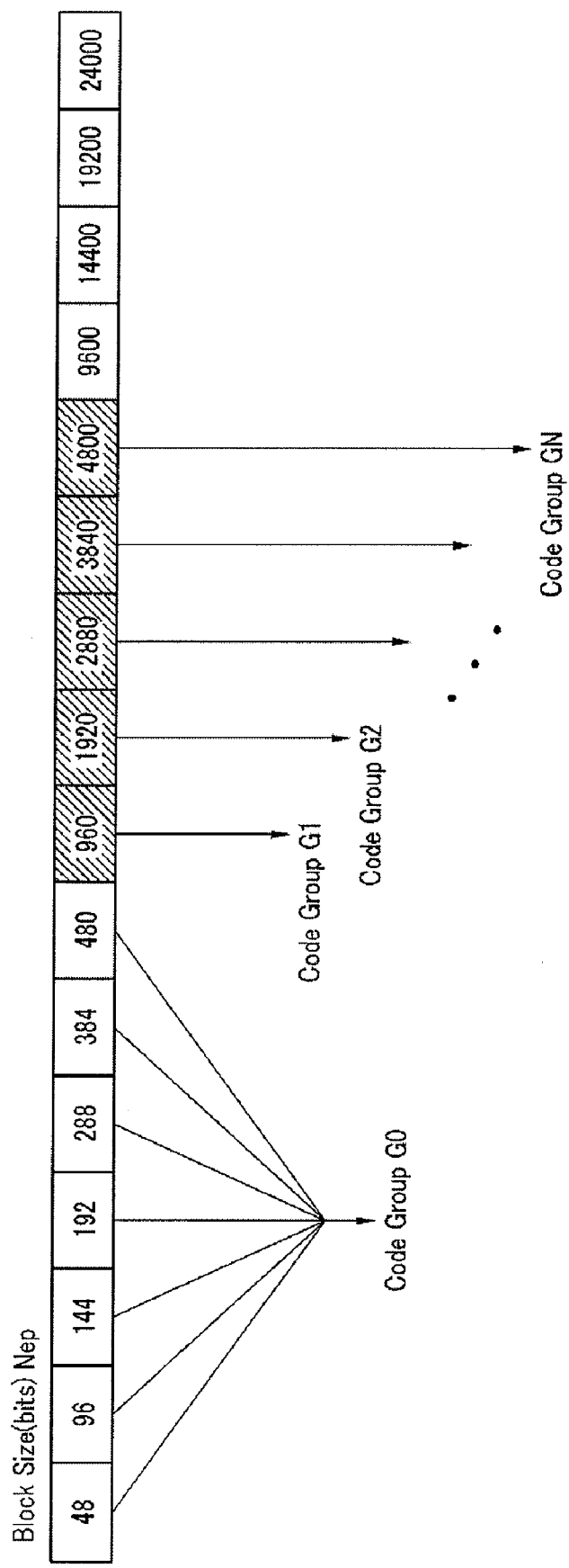
FIG. 3 is a view illustrating a procedure for allocating a bandwidth code group based on a size of a block according to an embodiment of the present invention.

FIG. 3 is a view illustrating a procedure for allocating a bandwidth code group based on a size of a block according to an embodiment of the present invention.

In the present invention, as shown in FIG. 3, bandwidth request (BR) codes are divided into several groups, and the BR codes of each group have a specific block size.

When uplink traffic occurs, the subscriber station selects a to-be-transmitted bandwidth request code group based on a size of traffic that is to be transmitted through the uplink. Next, the subscriber station selects an arbitrary bandwidth request code in the bandwidth request code group and transmits the bandwidth request code to the base station.

In an 802.16-based portable Internet system, an IP-based packet service is provided, and a unit of a block size of a data that is transmitted through uplink and downlink is shown in FIG. 3. The traffic that occurs in the IP-based packet service basically includes information such as a CP/UDP header, an IP header, a MAC header, and a cyclic redundancy check (CRC), and a length of the information is 400 bits or more. Generally, the size of the uplink traffic is concentrated in a range between 480 bits and 4800 bits in an array of the block size shown in FIG. 3.

As described above, since the block size of the uplink traffic that the subscriber station is to transmit is concentrated in a range between 960 bits and 4800 bits, the subscriber station requests bandwidth allocation according to the bandwidth request code based on each of the block sizes. Therefore, as shown in FIG. 3, the bandwidth request codes are divided into N code groups, and the code groups are mapped to the corresponding block sizes. The block sizes in a range of 48 bits to 480 bits are mainly used for MAC control messages other than the uplink traffic, so that the block sizes are mapped to a code group G0.

Since the block sizes of the uplink traffic are mostly concentrated in a range between 480 bits and 4800 bits, the block sizes in a range between 960 bits and 4800 bits are mapped to code groups G1, ..., GN. The base station broadcasts information on code groups corresponding to the block sizes to all subscriber stations by using an uplink channel descriptor (UCD).

When the uplink traffic occurs, the subscriber station that receives the information on code groups corresponding to the block sizes selects a code group corresponding to the block size of the traffic. Next, the subscriber station selects an arbitrary bandwidth request code in the selected code group and transmits the bandwidth request code to the base station in a competition scheme. The base station allocates uplink resources in a variable manner according to the code group including the received bandwidth request code.

Figure 4:
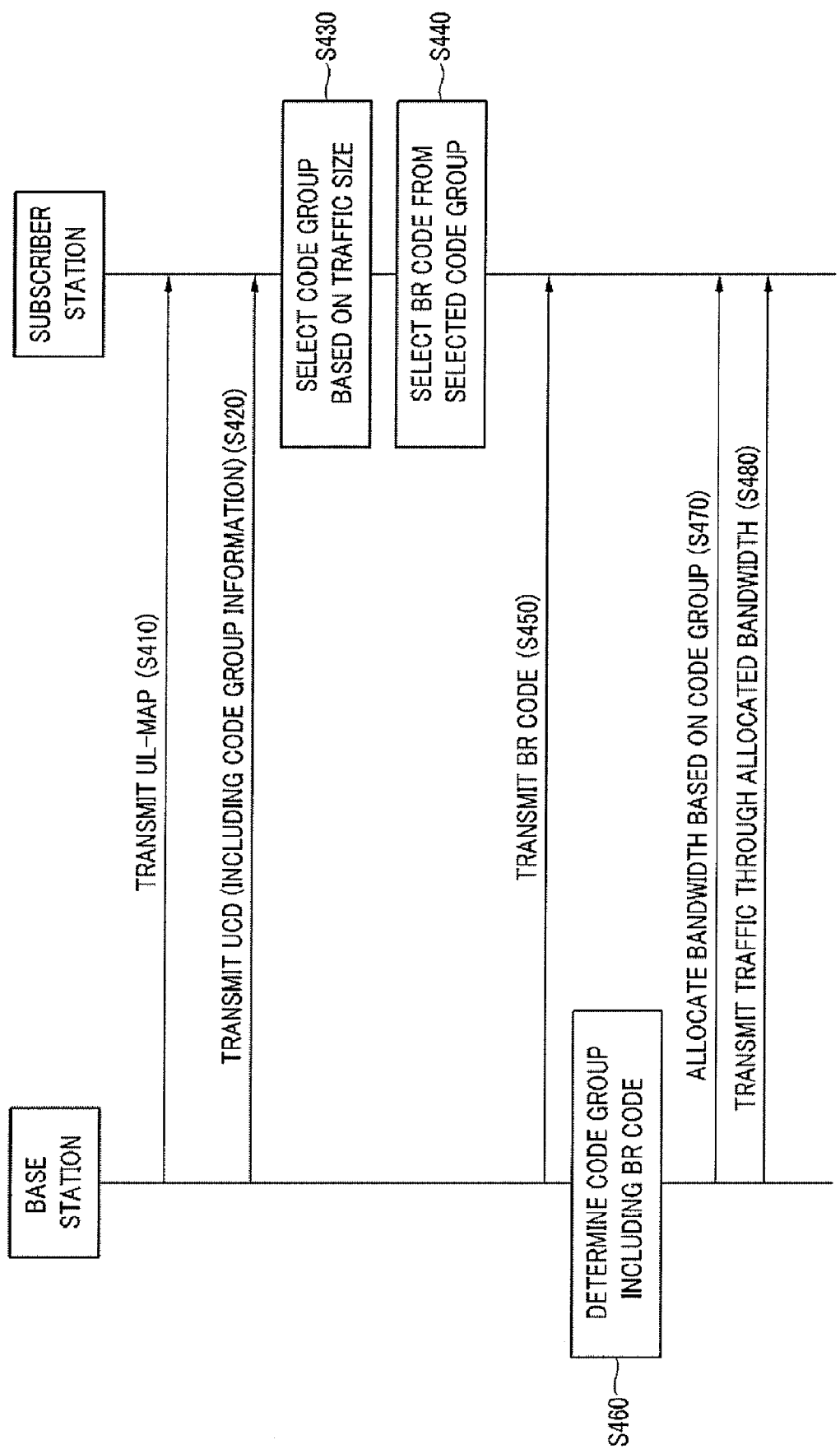
FIG. 4 is a flowchart illustrating a procedure for requesting resources and a procedure of allocating the resources by using BR ranging according to an embodiment of the present invention.

FIG. 4 is a flowchart illustrating a procedure for requesting resources and a procedure of allocating the resources by using BR ranging according to an embodiment of the present invention. Now, the procedure of requesting resources and the procedure of allocating the resources by using the BR ranging according to the embodiment of the present invention are described with reference to FIG. 4.

Firstly, the base station broadcasts the UCD including the information on the code group to the subscriber station (S410). At this time, the base station also transmits a UL-MAP.

Next, when there is traffic that is to be transmitted through the uplink, the subscriber station selects the code group corresponding to a block size of the to-be-transmitted traffic (S430). The subscriber station selects an arbitrary bandwidth request code in the selected code group (S440). The subscriber station transmits the selected bandwidth request code to the base station (S450).

The base station determines the code group including the received bandwidth request code (S460). The base station allocates a bandwidth corresponding to the code group to the subscriber station (S470).

Next, the subscriber station transmits the traffic through the bandwidth allocated by the base station.

The method of allocating the bandwidth to the subscriber station by the base station based on the code group including the bandwidth request code transmitted from the subscriber station and the method of transmitting the traffic through the bandwidth allocated from the base station by the subscriber station are classified into three types, which are described later in detail.

Figure 5:
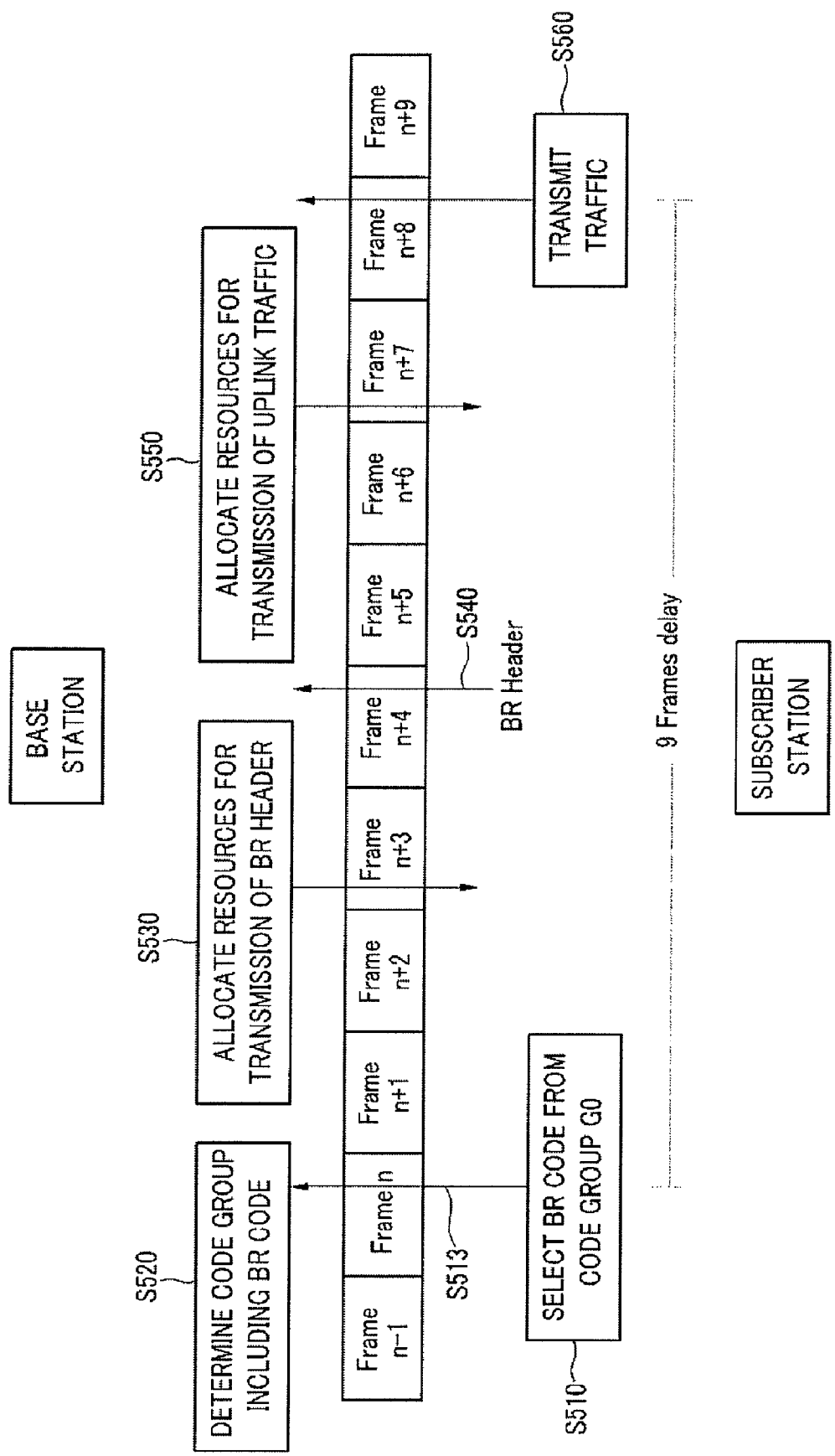
FIG. 5 is a view illustrating a BR ranging procedure in a case where a size of uplink traffic is 480 bits or less according to an embodiment of the present invention.

FIG. 5 is a view illustrating a BR ranging procedure in a case where the size of uplink traffic is 480 bits or less according to an embodiment of the present invention. Now, the BR ranging procedure in a case where the size of uplink traffic is 480 bits or less according to the embodiment of the present invention is described with reference to FIG. 5.

Firstly, in a case where the size of the to-be-transmitted uplink traffic is 480 bits or less, since the traffic is mainly an MAC control message which is not sensitive to a delay, the subscriber station selects an arbitrary bandwidth request code in the code group G0 (S510) and, after that, transmits the bandwidth request code to the base station (S513).

Next, the base station determines which code group the received bandwidth request code is included in (S520). In a case where the received bandwidth request code is determined to be included in the code group G0, the base station allocates uplink resources to the subscriber station so that the subscriber station can transmit a BR header (S530). The base station transmits the allocated uplink resources to the subscriber station (S530).

The subscriber station transmits to the base station the BR header indicating information on resources required for uplink traffic transmission by using the uplink resources allocated by the base station (S540).

Next, the base station allocates to the subscriber station the uplink resources corresponding to the information on the resources that the subscriber station requires (S550). The subscriber station transmits the uplink traffic to the base station (S560).

Figure 6:
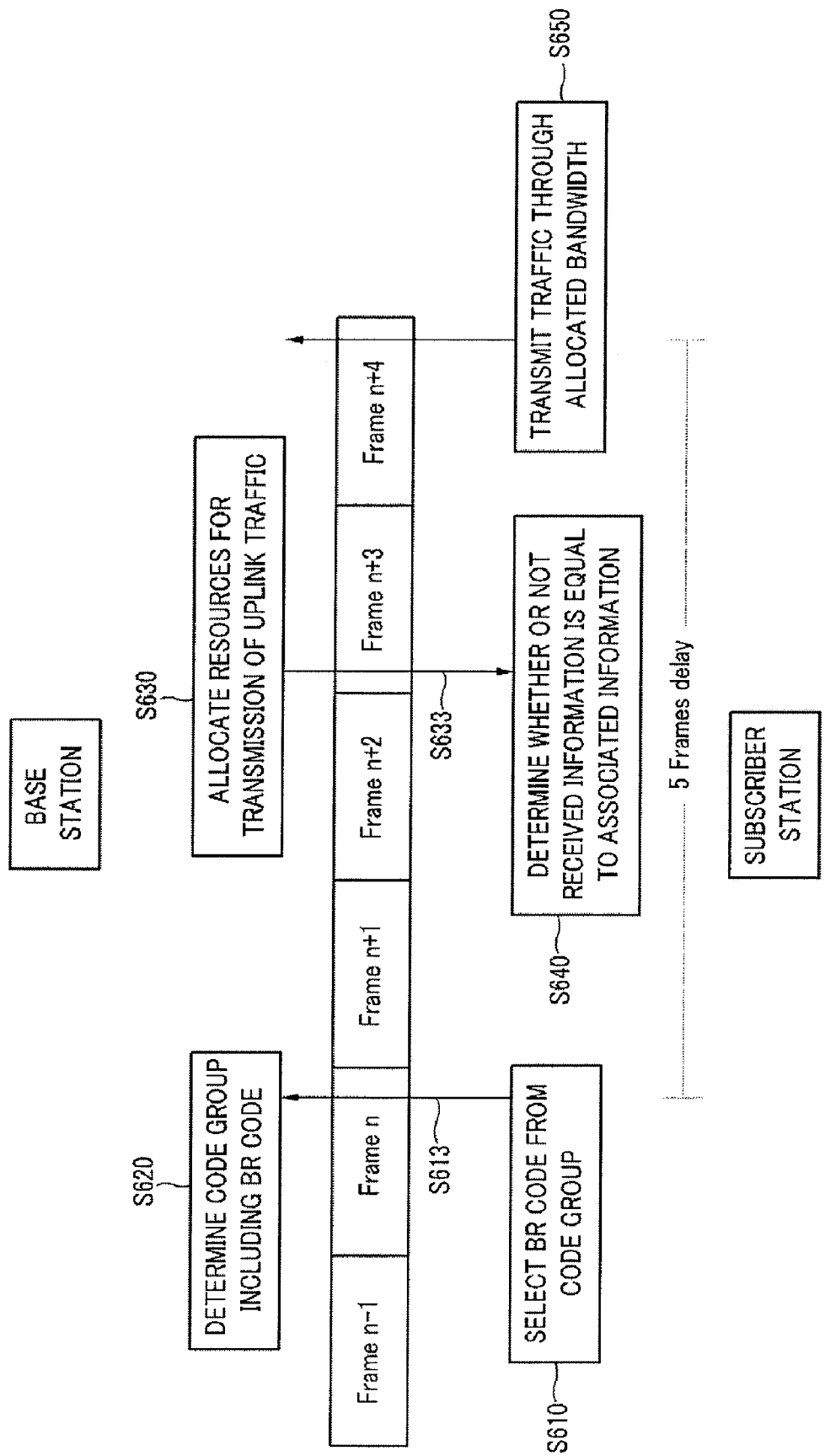
FIG. 6 is a view illustrating a BR ranging procedure in a case where a size of uplink traffic is in a range of 480 bits to 4800 bits according to an embodiment of the present invention.

FIG. 6 is a view illustrating a BR ranging procedure in a case where the size of to-be-transmitted uplink traffic is in a range of 480 bits to 4800 bits according to an embodiment of the present invention. Now, the BR ranging procedure in a case where the size of the uplink traffic is in a range of 480 bits to 4800 bits according to the embodiment of the present invention is described with reference to FIG. 6.

As shown in FIG. 6, in a case where the size of the to-be-transmitted uplink traffic is in a range of 480 bits to 4800 bits, the subscriber station selects an arbitrary bandwidth request code corresponding to the block size that is the largest one among the block sizes larger than the size of the traffic in the code groups G1, . . . , GN (S610). The subscriber station transmits the bandwidth request code to the base station (S613).

When the received bandwidth request code is determined to be included in one of the code groups G1, . . . , GN (S620), the base station allocates the uplink resources corresponding to the block size corresponding to the code group (S630) to the subscriber station. The base station transmits CDMA_Allocation_IE of the UL-MAP including a frame number of the received BR code, subchannel information, received BR code number information, and bandwidth allocation information to all the subscriber stations (S633).

Next, the subscriber station determines whether or not the CDMA_Allocation_IE of the UL-MAP is equal to the information that the subscriber station transmits (S640). If the CDMA_Allocation_IE of the UL-MAP is determined to be equal to the information, the subscriber station transmits the traffic by using the uplink resources allocated by the base station (S650).

Accordingly, a delay taken for the subscriber station to transmit the uplink traffic from the time of transmitting the bandwidth allocation code to the time of being allocated with the resources can be reduced from 9 frames to 5 frames.

Figure 7:
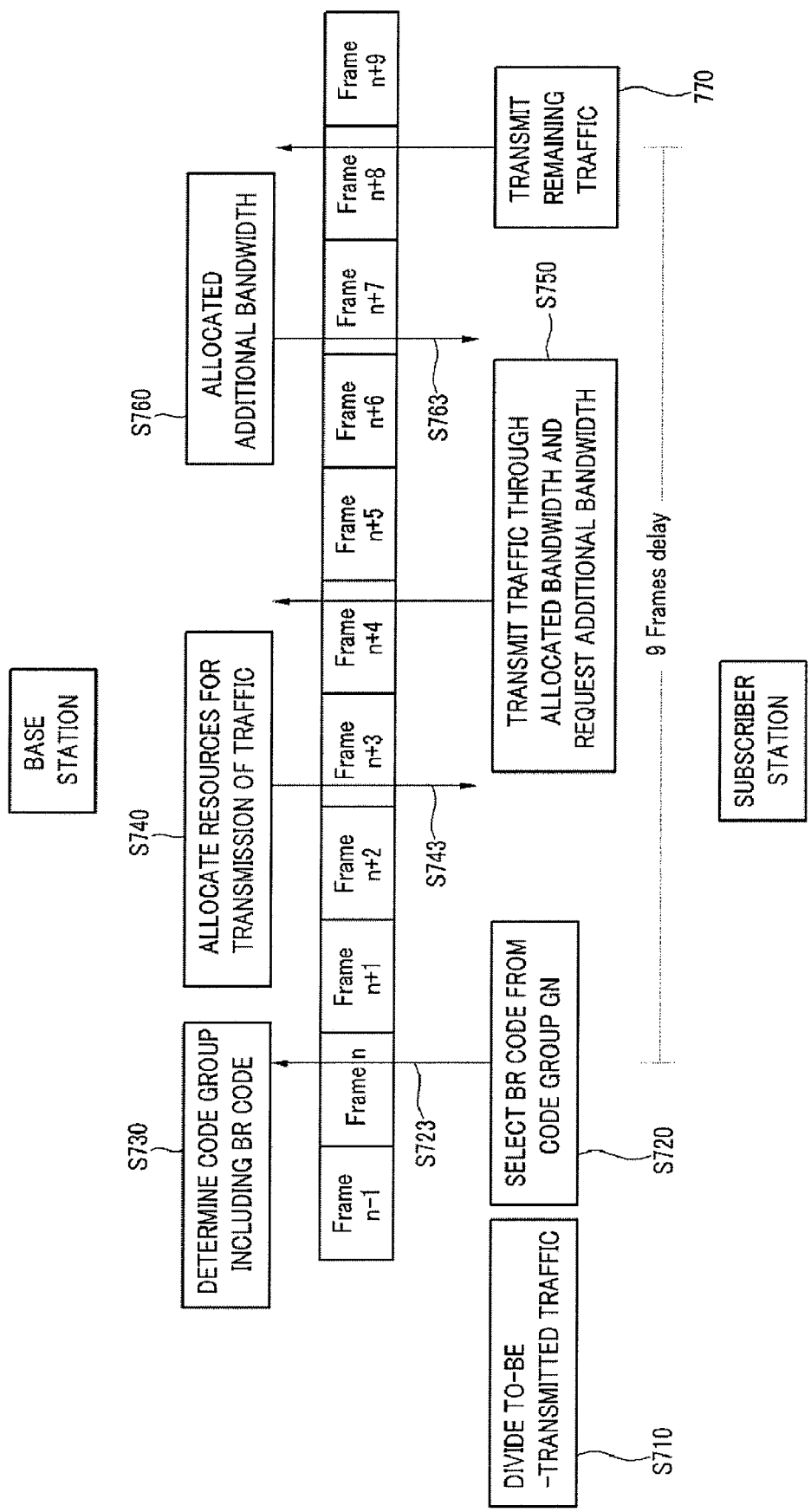
FIG. 7 is a view illustrating a BR ranging procedure in a case where a size of uplink traffic is 4800 bits or more according to an embodiment of the present invention.

FIG. 7 is a view illustrating a BR ranging procedure in a case where the size of uplink traffic is 4800 bits or more according to an embodiment of the present invention. Now, the BR ranging procedure in a case where the size of the uplink traffic is 4800 bits or more according to the embodiment of the present invention is described with reference to FIG. 7.

As shown in FIG. 7, in a case where a size of the to-be-transmitted uplink traffic is 4800 bits or more, the subscriber station transmits segmented traffic.

Firstly, the subscriber station segments the uplink traffic so as to be suitable for the 4800 bits (S710). The subscriber station selects an arbitrary BR code in the code group GN corresponding to the 4800 bits (S720) and transmits the BR code (S723).

Next, the base station determines the code group including the received BR code (S730). If the code group including the BR code is in a range of the code group G1 to code group GN, the base station allocates 4800-bit uplink resources corresponding to the code group including the received BR code (S740). The base station broadcasts the CDMA_Allocation_IE of the UL-MAP including the allocation information (S743) to all subscriber stations.

Next, the subscriber station adds a grant management (GM) subheader to the segmented uplink traffic that is segmented so as to be suitable for the allocated resources and transmits the segmented uplink traffic together with the GM subheader to the base station (S750). The GM subheader includes additional resource request information.

Next, when the segmented uplink traffic and the GM subheader are received from the subscriber station, the base station allocates the additional resources that are requested through the GM subheader (S760) to the UL-MAP and transmits the additional resources to the subscriber station (S763).

Next, the subscriber station transmits remaining traffic by using the additional resources allocated by the base station (S770).

Accordingly, since the subscriber station can transmit the segmented traffic, it is possible to transmit a large size of traffic without an additional delay.

Exemplary embodiments of the present invention can be implemented not only through the aforementioned method and/or apparatus but also through computer programs executing functions in association with the structures of the exemplary embodiments of the present invention or through a computer readable recording medium having embodied thereon the computer programs. The present invention can be easily implemented by those skilled in the art by using the above descriptions according to the exemplary embodiments.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

According to the present invention, bandwidth request codes are divided into code groups of which bandwidth request codes represent specific block sizes, and a base station that receives the bandwidth request code allocates uplink resources corresponding to the bandwidth request code, so that it is possible to decrease a transmission delay of the uplink traffic.

In addition, due to a decrease in the transmission delay of the uplink traffic, it is possible to prevent a decrease in a downlink traffic transmission speed that may be caused by a transmission delay of an uplink ACK in a TCP-based Internet service.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of allocating uplink resources to a subscriber station by using bandwidth request ranging in a mobile communication system, comprising:
    transmitting an uplink channel descriptor (UCD) including code group information to the subscriber station, wherein the code group information is obtained by dividing a range of bandwidth request codes into a plurality of code groups, each code group having at least two bandwidth request codes, and mapping the code groups to predetermined data block sizes;
    receiving a bandwidth request code selected in the subscriber station, wherein the selected bandwidth request code is one of the at least two bandwidth request codes included in a code group that is selected by the subscriber station among the plurality of code groups;
    determining a code group including the selected bandwidth request code among the plurality of code groups; and
    allocating to the subscriber station a bandwidth through which a data block size corresponding to the determined code group can be transmitted,
    wherein the determining of the code group including the selected bandwidth request code comprises, when the code group including the selected bandwidth request code is determined to be a first code group that is mapped to a data block size less than or equal to a first reference value:
        allocating a bandwidth through which the subscriber station transmits a bandwidth request header, to the subscriber station, and
        receiving from the subscriber station the bandwidth request header including bandwidth information that the subscriber station uses to transmit uplink traffic,
    wherein the determining of the code group including the selected bandwidth request code comprises, when the code group including the selected bandwidth request code is determined to be a second code group that is mapped to a data block size greater than the first reference value and less than or equal to a second reference value:
        allocating a bandwidth through which the subscriber station can transmit data having a data block size corresponding to the second code group to the subscriber station, and
    wherein the determining of the code group including the selected bandwidth request code comprises, when the code group including the selected bandwidth request code is determined to be a third code group that is mapped to a data block size greater than or equal to the second reference value:
        allocating a bandwidth through which the subscriber station can transmit data having a data block size of the second reference value to the subscriber station,
        receiving uplink traffic having a size of the second reference value and an additional bandwidth request message, and
        allocating a bandwidth corresponding to the additional bandwidth request message to the subscriber station.

2. The method of claim 1, wherein the first reference value is 480 bits and the second reference value is 4800 bits.

3. A method of requesting uplink resource allocation to a base station by using bandwidth request ranging in a mobile communication system, comprising:
    receiving an uplink channel descriptor (UCD) including code group information from the base station, wherein the code group information is obtained by dividing a range of bandwidth request codes into a plurality of code groups, each code group having at least two bandwidth request codes, and mapping the code groups to predetermined data block sizes;
    selecting a code group corresponding to a data size of traffic that is to be transmitted through an uplink among the code groups;
    selecting an arbitrary bandwidth request code from the selected code group;
    transmitting the selected bandwidth request code to the base station;
    being allocated a bandwidth through which the traffic is transmitted from the base station; and
    transmitting the traffic through the allocated bandwidth,
    wherein, in a case where the data size of the to-be-transmitted traffic is a reference value or more, the selecting of the arbitrary bandwidth request code comprises dividing the to-be-transmitted traffic into data having a size of the reference value and remaining data and selecting the bandwidth request code of a code group that is mapped to a data block size including the reference value, and
    wherein the transmitting of the traffic comprises:
        transmitting an additional bandwidth request message to the base station in order to transmit the data having the size of the reference value and the remaining data,
        being allocated additional bandwidth through which the bandwidth request message is transmitted, from the base station, and
        transmitting the remaining data through the allocated additional bandwidth.

4. The method of claim 3, wherein the reference value is 4800 bits.

5. A base station for allocating uplink resources to a subscriber station by using bandwidth request ranging in a mobile communication system, comprising:

a transmission module that transmits an uplink channel descriptor (UCD) including code group information to the subscriber station, wherein the code group information is obtained by dividing a range of bandwidth request codes into a plurality of code groups, each code group having at least two bandwidth request codes, and mapping the code groups to predetermined data block sizes;

a reception module that receives a bandwidth request code selected in the subscriber station, wherein the selected bandwidth request code is one of the at least two bandwidth request codes included in a code group that is selected by the subscriber station among the plurality of code groups;

a determination module that determines the code group including the selected bandwidth request code among the plurality of code groups; and an allocation module that allocates a bandwidth through which a data block size corresponding to the determined code group can be transmitted, to the subscriber station, wherein, when the code group including the selected bandwidth request code is determined to be a first code group that is mapped to a data block size less than or equal to a first reference value, the allocation module allocates a bandwidth through which the subscriber station transmits a bandwidth request header to the subscriber station, wherein, when the code group including the selected bandwidth request code is determined to be a second code group that is mapped to a data block size greater than the first reference value and less than a second reference value, the allocation module allocates a bandwidth through which the subscriber station can transmit data having a data block size corresponding to the second code group to the subscriber station, wherein, when the code group including the selected bandwidth request code is determined to be a third code group that is mapped to a data block size greater than or equal to the second reference value, the allocation module allocates a bandwidth through which the subscriber station can transmit data having a data block size of the second reference value to the subscriber station, and wherein, in a case where the reception module receives uplink traffic having a size of the second reference value and an additional bandwidth request message from the subscriber station, the allocation module allocates a bandwidth corresponding to the additional bandwidth request message to the subscriber station.

6. The base station of claim 5, wherein the first reference value is 480 bits and the second reference value is 4800 bits.

7. A subscriber station for requesting uplink resource allocation to a base station by using bandwidth request ranging in a mobile communication system, comprising:

a reception module that receives an uplink channel descriptor (UCD) including code group information from the base station, wherein the code group information is obtained by dividing a range of bandwidth request codes into a plurality of code groups, each code group having at least two bandwidth request codes, and mapping the code groups to predetermined data block sizes;

a selection module that selects a code group corresponding to a data size of traffic that is to be transmitted through an uplink among the code groups, and selects an arbitrary bandwidth request code from the selected code group;

a transmission module that transmits the selected bandwidth request code to the base station;

an allocation module that receives an allocation of a bandwidth through which the traffic is transmitted, from the base station; and a traffic transmission module that transmits the traffic through the allocated bandwidth, wherein, when a data size of the to-be-transmitted traffic is greater than or equal to a reference value, the selection module divides the to-be-transmitted traffic into data having a size of the reference value and remaining data and selects the bandwidth request code of a code group that is mapped to a data block size including the reference value, and wherein, in a case where the traffic transmission module transmits an additional bandwidth request message to the base station in order to transmit the data having the size of the reference value and the remaining data, the allocation module receives an allocation of additional bandwidth through which the bandwidth request message is transmitted, from the base station, and the traffic transmission module transmits the remaining data through the allocated additional bandwidth.

8. The subscriber station of claim 7, wherein the reference value is 4800 bits.

* * * * *